United States Patent
Ahmed et al.

(10) Patent No.: US 12,357,426 B1
(45) Date of Patent: Jul. 15, 2025

(54) APPARATUS AND METHOD FOR RECOMMENDING WHEN TO DISCARD A USED DENTAL FILE DURING USE

(71) Applicant: KING FAISAL UNIVERSITY, Hofouf (SA)

(72) Inventors: Muhammad Adeel Ahmed, Hofouf (SA); Rizwan Jouhar, Hofouf (SA)

(73) Assignee: KING FAISAL UNIVERSITY, Hofouf (SA)

( * ) Notice: Subject to any disclaimer, the term of this patent is extended or adjusted under 35 U.S.C. 154(b) by 0 days.

(21) Appl. No.: 19/196,056

(22) Filed: May 1, 2025

Related U.S. Application Data

(63) Continuation of application No. 19/082,965, filed on Mar. 18, 2025, now abandoned.

(51) Int. Cl.
| | | |
|---|---|---|
| A61C 5/50 | (2017.01) | |
| A46B 9/02 | (2006.01) | |
| A46B 13/04 | (2006.01) | |
| A46B 15/00 | (2006.01) | |
| G06T 7/00 | (2017.01) | |

(52) U.S. Cl.
CPC ............... *A61C 5/50* (2017.02); *A46B 9/025* (2013.01); *A46B 9/026* (2013.01); *A46B 13/04* (2013.01); *A46B 15/0004* (2013.01); *A46B 15/0048* (2013.01); *G06T 7/0012* (2013.01); *A46B 2200/3073* (2013.01); *A61C 2204/007* (2013.01); *G06T 2207/30036* (2013.01)

(58) Field of Classification Search
None
See application file for complete search history.

(56) References Cited

U.S. PATENT DOCUMENTS

| | | | |
|---|---|---|---|
| 5,961,937 A | 10/1999 | Gobbato | |
| 9,503,282 B2 * | 11/2016 | Kody | ............... H04N 1/0022 |
| 10,017,894 B2 | 7/2018 | Strahle | |

FOREIGN PATENT DOCUMENTS

| | | |
|---|---|---|
| CN | 108421744 A | 8/2018 |
| CN | 108498200 A | 9/2018 |
| CN | 108514457 A | 9/2018 |
| CN | 108542535 A | 9/2018 |
| CN | 213156662 U | 5/2021 |
| CN | 218279859 U | 1/2023 |
| CN | 113000422 B | 3/2024 |

* cited by examiner

*Primary Examiner* — Eric W Golightly
(74) *Attorney, Agent, or Firm* — Nath, Goldberg & Meyer; Joshua B. Goldberg

(57) ABSTRACT

An apparatus for recommending whether to discard a dental file during use includes a processor, a plurality of laser profilometers oriented to direct their respective laser beams toward a first spatial region where a dental file is configured to travel along, a plurality of cameras oriented toward a second spatial region where the dental file is configured to travel along, at least one selected from the group consisting of a display screen and a speaker, and a non-transitory, tangible program storage medium, embodying a program of instructions executable by the processor to perform method steps for determining to discard the dental file. The method includes inserting the file in the apparatus to inspect the file with the cameras and the laser profilometers when the file is new and subsequently when the file has been used to determine whether the file should be discarded.

11 Claims, 6 Drawing Sheets

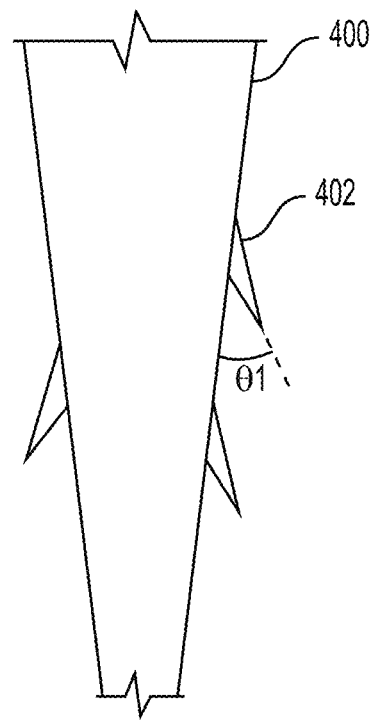
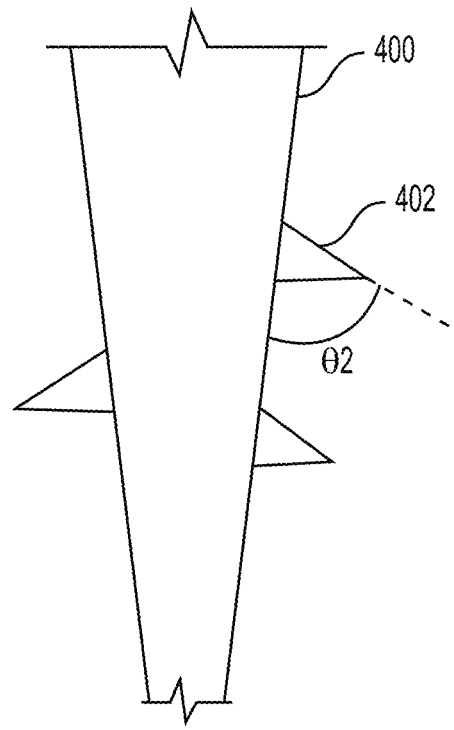
FIG. 4A  FIG. 4B
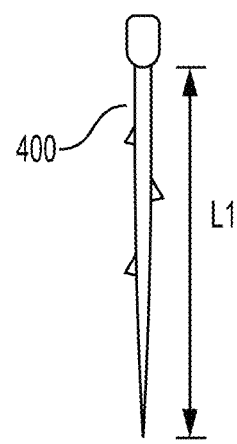
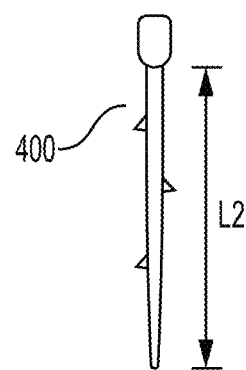
FIG. 5A  FIG. 5B

APPARATUS AND METHOD FOR RECOMMENDING WHEN TO DISCARD A USED DENTAL FILE DURING USE

CROSS-REFERENCE TO RELATED APPLICATION

This application is a continuation of U.S. patent application Ser. No. 19/082,965, filed on Mar. 18, 2025, the entire contents of which are incorporated herein by reference.

TECHNICAL FIELD

The present disclosure relates to dental files, and more particularly, to a system and method for recommending to a dental professional when to discard a dental file during use.

DISCUSSION OF THE RELATED ART

Endodontics is a branch of dentistry that focuses on the roots of teeth. A root canal procedure is often performed by an endodontist to remove the pulp (or nerve tissue) from the root canals of a tooth. A dental file is a long and narrow metallic instrument used by an endodontist to remove the pulp from root canals. To remove the pulp, an endodontist inserts a file in a root canal and rotates the file inside of the root canal.

Dental files experience wear with use, which causes their effectiveness to be reduced. In addition, a dental file that has been used for an extended period of time might break inside of a root canal during use. The breakage of a dental file inside of a root canal is undesirable because the part of the file that breaks off typically ends up being stuck inside of the root canal. Procedures used for grasping and dislodging a broken piece of file from a root canal are often damaging to the tooth being worked on and time consuming.

SUMMARY

The present disclosure relates to a chairside dental apparatus and a method of using the same for determining with accuracy when a dental file has been used to a state that warrants the file to be discarded. In more detail, the apparatus of the present disclosure can be used to assess the physical condition of a dental file and to suggest to an endodontist to discard the dental file based on the assessment.

The teachings of the present disclosure can be applied to significantly reduce the likelihood of a dental file breaking inside of a root canal during use. This is because the determination to discard a file can be made when a dental file begins to show signs of physical deterioration from use but still has some usable life left before breaking. The development of fractures and/or chipping on the surface of the file are indicators of such deterioration.

The apparatus and method of method of the present subject matter can also be used to determine when a dental file is worn beyond a certain point when it becomes ineffective (or of little efficacy) and/or undesirable for its intended purpose, and to inform an endodontist to discard the file when such a determination has been made. An opening of protrusions of the file as defined in this specification and/or a wearing out (or blunting) of the distal tip of the file are non-limiting examples of such indicators.

The process of discarding a dental file when the file has been worn out to a certain point can optimize an endodontist's use of time (by eliminating the waste of time resulting from the reduced efficacy of a worn out tool) and expenditure of resources (by putting to use a new dental file only when needed).

In addition, the apparatus of the present subject matter can be used to clean a dental file during use.

BRIEF DESCRIPTION OF THE DRAWINGS

The above and other features of the present disclosure will become more apparent by describing in detail exemplary embodiments thereof in conjunction with the accompanying drawings, in which:

FIG. 4A is a three-dimensional (3D) profile view illustrating a portion of a dental file in a new condition;

FIG. 4B is a 3D profile view illustrating the portion of the dental file of FIG. 3B in a used condition;

FIG. 5A is a 3D profile view illustrating a dental file in a new condition;

FIG. 5B is a 3D profile view illustrating the dental file of FIG. 5A in a used condition;

DETAILED DESCRIPTION OF THE EMBODIMENTS

Figure 1:
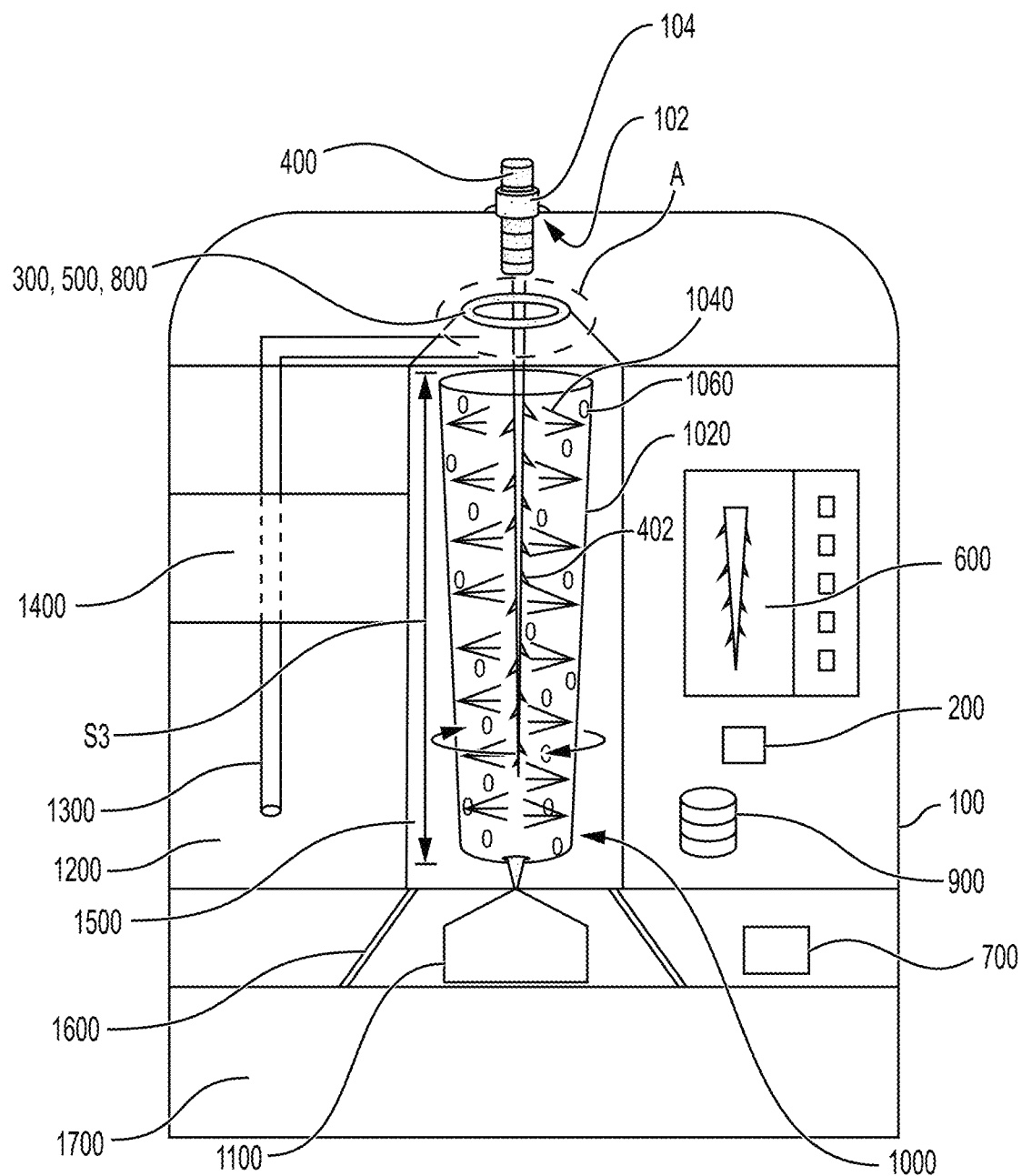
FIG. 1 is composite side view illustrating an apparatus for recommending whether to discard a dental file after use according to an embodiment of the present subject matter.

Exemplary embodiments of the present disclosure will be described more fully hereinafter with reference to the accompanying drawings. The present disclosure may, however, be embodied in different forms and should not be construed as being limited to the embodiments set forth herein. Like reference numerals may refer to like elements throughout the specification. The sizes and/or proportions of the elements illustrated in the drawings may be exaggerated for clarity.

When an element is referred to as being disposed on another element, intervening elements may be disposed therebetween. In addition, elements, components, parts, etc., not described in detail with respect to a certain figure or embodiment may be assumed to be similar to or the same as corresponding elements, components, parts, etc., described in other parts of the specification.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" may include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

The order of the method steps described in this specification does not limit the present subject matter thereto. The method steps described in this specification may be performed in the order presented in the specification, or in a different order, unless the context clearly indicates otherwise.

The present specification discloses a chairside dental apparatus that can be used by a dental professional to accurately and safely determine whether a dental file (including an endodontic dental file) is acceptable for subsequent use on a patient. The chairside dental apparatus may be referred to as an "apparatus" for brevity purposes. A dental file may also be referred to as a "file" for brevity purposes.

Signs of wear, deformation, fracturing, chipping, etc., of a file can be assessed by using an apparatus as described in this specification to determine whether the dental file is deemed as being acceptable for use on a patient subsequent to the assessment or whether the dental file should be discarded.

Wear of the tip of a file (or wear of the end portion of the dental file that is distal to the dental drill, file holder, etc., used by a dental professional to hold the file) can be assessed and compared against a predetermined wear threshold value to determine whether the dental file is recommended for further use on a patient or whether it should be discarded. For example, wear on the tip of a file can shorten the length of the file, and the reduction of length of a file beyond a certain limit can make a file undesirable and/or of low efficacy, ineffective for use, or harmful to use.

A flute of a dental file is a groove that extends in a spiraling manner along the active part of the body of the file. A flute defines what is referred to as "land" along the length of the active part of the file body. The "land" spirals along the active part of the file body, and is the component of the file that effectuates the removal of dental material/debris from a tooth. While a "land" is generally of a continuous length along the active part of the file body, the "land" appears as defining a plurality of individual protrusions when the file is viewed in a profile view (or side view). The individual protrusions (in profile view) are typically sharp, and will be referred to as a "protrusion" or "protrusions" in this specification for convenience purposes. Therefore, a dental file includes a plurality of protrusions when viewed in profile.

With extended use, the flutes tend to open up (or spread out) when the dental file is observed in profile view. The spreading out of the flutes of a dental file is indicative that the file has passed its preferred condition for use and is entering the last portion of its usable life, although it may still have a limited amount of effective (or somewhat effective) use left. The point of detecting that the number of additional uses of a file is limited may be deemed to be a good time to discard the file to avoid potential issues in the future related to excessive wear of a file (e.g., ineffectiveness, or significantly reduced effectiveness of the tool, or the tool becoming potentially harmful).

The apparatus of the present disclosure can be used to detect the degree of opening of the flutes, to compare the detected degree of opening with a predetermined threshold value, and based on the comparison, to determine whether the file is suitable for further use on a patient.

In addition, fractures or chips on a dental file can be detected, quantified, and checked against a predetermined threshold value to determine whether a dental file is acceptable for further use. For example, the development of fractures or chips on a file is generally a warning sign that the file is starting to show signs of fatigue and, as a result, may break with continued use on a patient. However, the mere development of fractures on a file does not necessarily indicate that the file should be discarded immediately without being used on a patient again.

The apparatus of the present subject matter can be used to detect the amount of fractures or chips (or to quantify the fractures or chips) and to compare the quantified value with a predetermined threshold value. The determination on whether to discard the analyzed file can be made based on the results of the comparison. For example, when the quantity of fractures or chips detected on a dental file is below a predetermined threshold value, the file can be used again. When the quantity of fractures or chips detected on a dental file is equal to or greater than the predetermined threshold value, the apparatus can be used to alert the user (e.g., a dental professional) to discard the file.

A dental file need not possess all of the measurable defects taught by this specification in order to recommend to a dental professional to discard the same. The presence of a single defect (e.g., wear of the tip alone, opening of the protrusions alone, etc.) that meets or exceeds a predetermined threshold value is potentially sufficient for generating a recommendation to discard the file.

Figure 2:
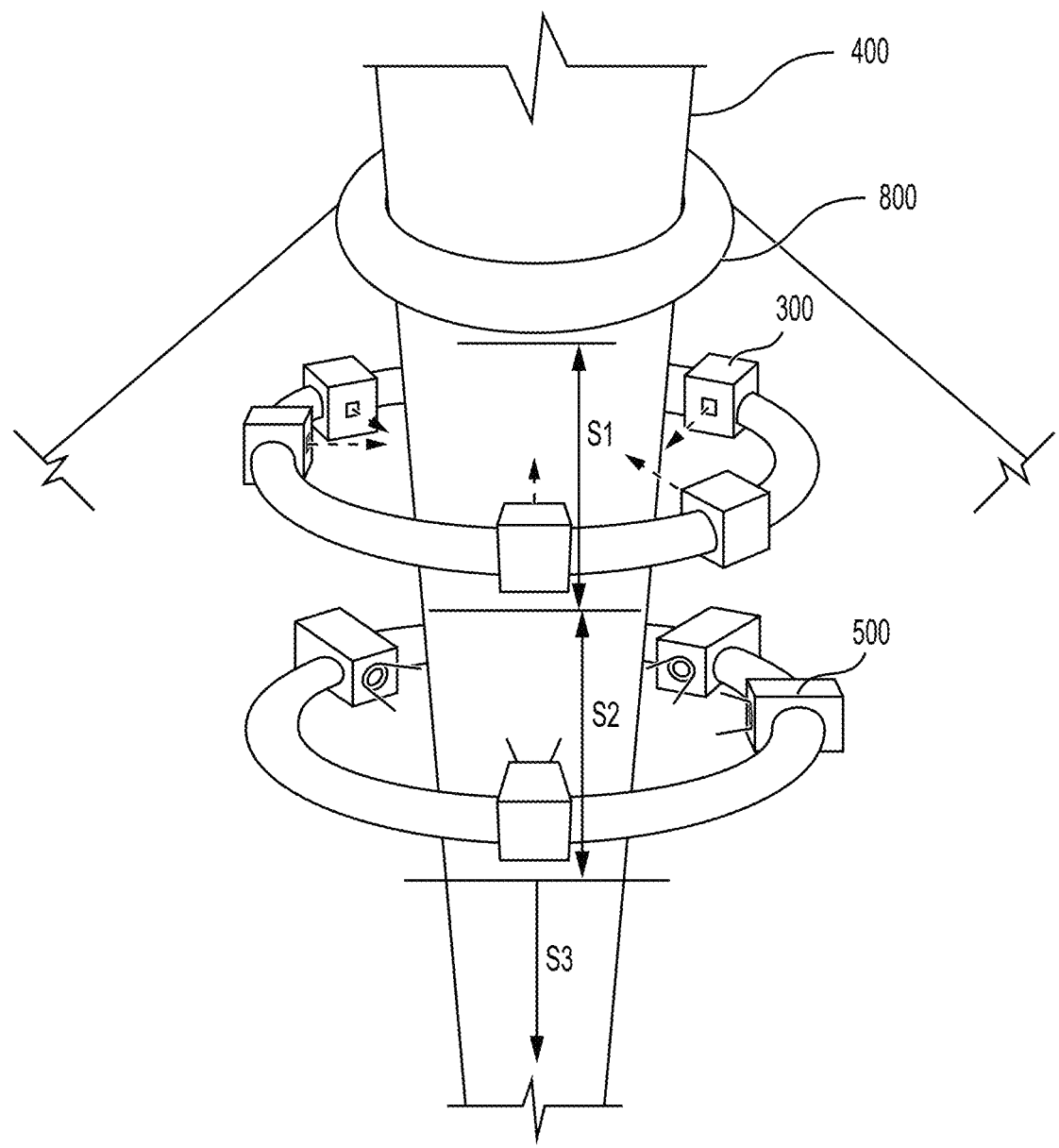
FIG. 2 is a side view illustrating a region A of FIG. 1.

Referring to FIGS. 1-2, an apparatus for recommending whether to discard a dental file after use may include a housing 100 with an opening 102, a processor 200, a plurality of laser profilometers 300 spaced from one another and oriented to direct their respective laser beams toward a first spatial region S1 where a dental file 400 is configured to travel along, a plurality of cameras 500 spaced apart from one another and oriented toward a second spatial region S2 where the dental file 400 is configured to travel along, at least one selected from the group consisting of a display screen 600 and a speaker 700, a damping component 800, a database 900, a rotatable brushing structure 1000 extending along a third spatial region S3 where the dental file 400 is configured to travel along, a motor 1100 connected to the rotatable brushing structure 1000 and configured to selectively rotate the structure 1000, a first reservoir 1200 configured to hold a liquid for cleaning the dental file 400, a first conduit 1300 in fluid communication with the first reservoir 1200, a pump 1400 configured to suction the liquid and to direct the same toward the third spatial region S3 when the dental file 400 is selectively inserted in the third spatial region S3, the third spatial region S3 being included within a cleaning chamber 1500 of the housing 100 of the apparatus, a second conduit 1600 configured to drain the cleaning chamber 1500 of the housing 100, and a second reservoir 1700, said second reservoir 1700 being a drainage reservoir.

The database 900 may include a non-transitory, tangible program storage medium, embodying a program of instructions executable by the processor 200 to perform method steps for determining when to recommend discarding the dental file 400 after use. The method steps will be described with reference to FIGS. 3A-3B.

As illustrated in FIG. 2, the plurality of laser profilometers 300 is oriented to direct their respective laser beams toward the first spatial region S1 where the dental file 400 is configured to travel along when inserted in the housing 100 through the opening 102 (FIG. 1 shows the dental file 400 after being inserted in the apparatus). The plurality of laser profilometers 300 can be arranged around the first spatial region S1, and can be used for scanning the dental file 400 all-around as the dental file 400 is inserted in the housing 100 of the apparatus. By way of non-limiting example, the plurality of laser profilometers 300 can be arranged in a ring formation around the first spatial region S1.

The scan data obtained from the laser profilometers 300 can be used for creating a three-dimensional (3D) surface profile of the dental file. For example, scan data obtained by the individual laser profilometers 300 (each of which "sees" only a portion of the file when the file is moved through the first spatial region S1) can be combined, e.g., by the processor 200, to form a 3D surface profile of the entire dental file.

As illustrated in FIG. 2, the plurality of cameras 500 is oriented toward the second spatial region S2 where the dental file 400 is configured to travel along when inserted in the housing 100. The plurality of cameras 500 can be arranged around the second spatial region S2, and can be used for scanning the dental file 400 all-around as the dental file 400 is inserted in the housing 100 of the apparatus. For example, the plurality of cameras 500 can be arranged in a ring formation around the second spatial region S2.

The image scan data obtained from the cameras can be used for creating an image of the dental file. For example, the image scan data obtained by the individual cameras 500 (each of which "sees" only a portion of the file when the file is moved through the second spatial region S2), whether it contains still images and/or video, can be combined, e.g., by the processor 200, to form a two-dimensional (2D) image of the entire dental file 400.

FIG. 2 illustrates the first and second spatial regions S1 and S2 as being mutually exclusive of one another. However, the present subject matter is not limited to this configuration. For example, the first and second spatial regions S1 and S2 can also overlap depending on the arrangement and field of view of the laser profilometers 300 and the cameras 500.

Figure 3A:
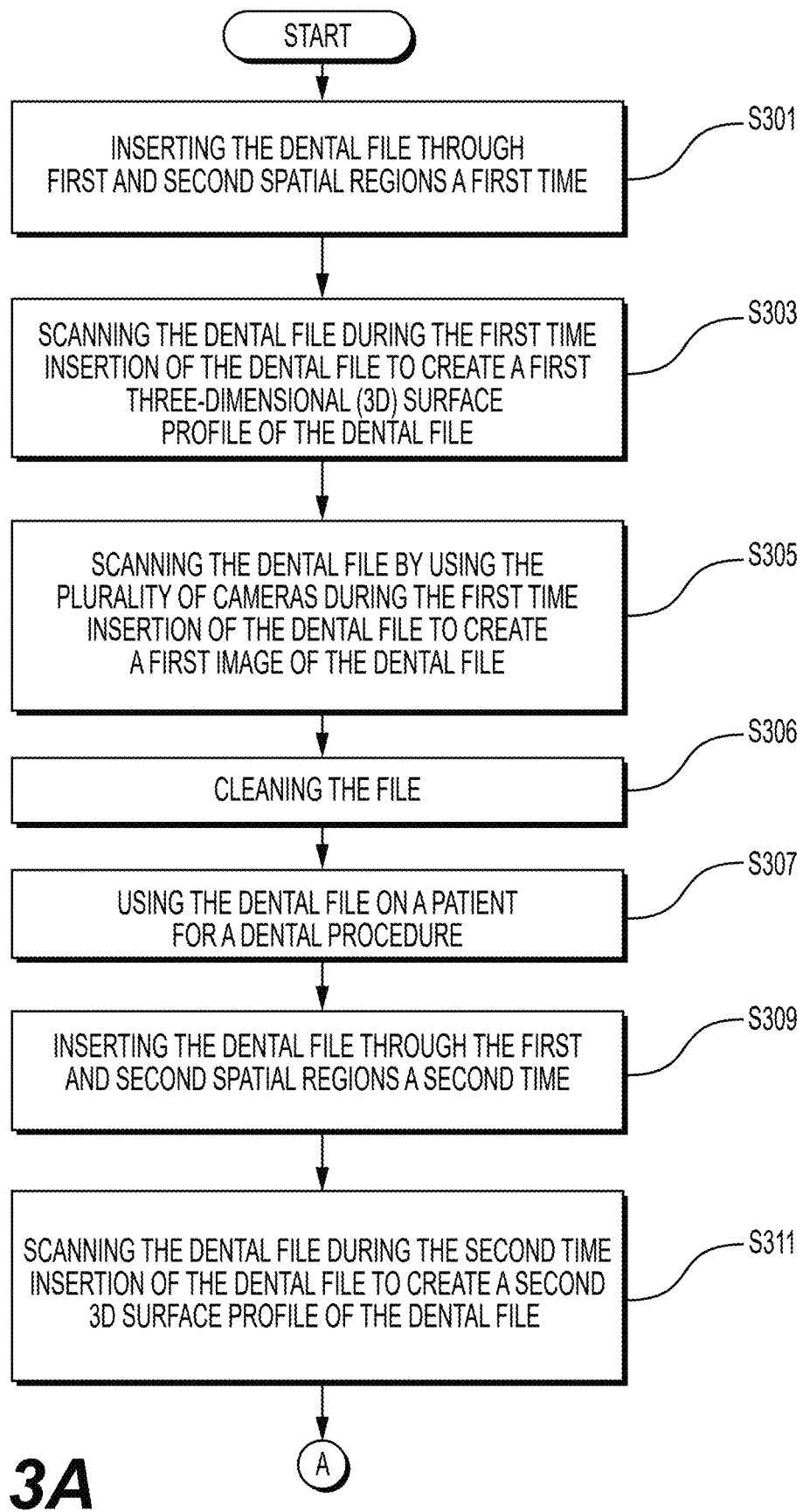
FIGS. 3A-3B are diagrams illustrating a method for recommending whether to discard a dental file after use according to an embodiment of the present subject matter.
Figure 3B:
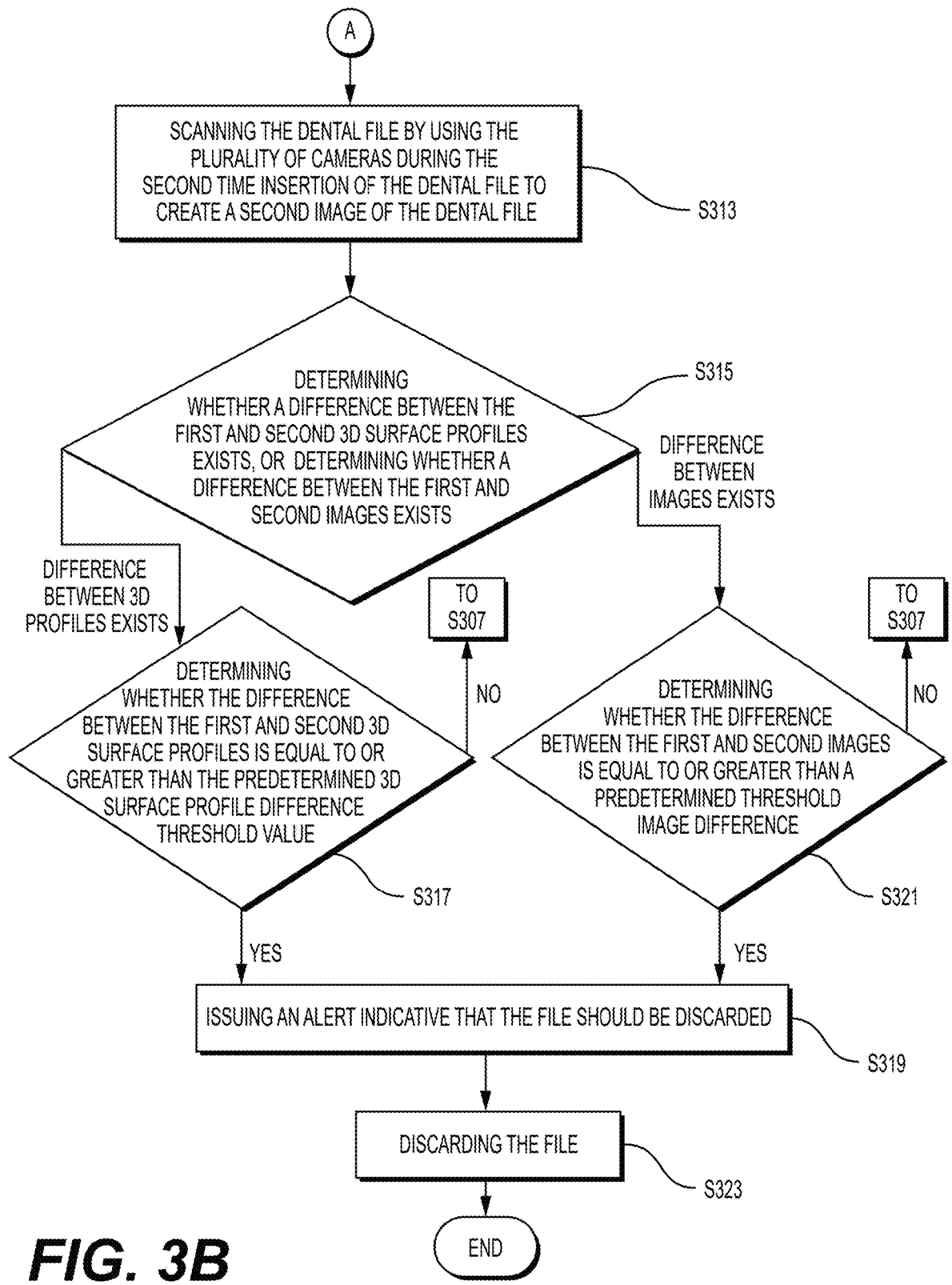

Referring to FIGS. 3A-3B, the method of the present subject matter includes inserting the dental file 400 through the first and second spatial regions S1 and S2 a first time (step S301). FIG. 1 illustrates the dental file 400 after insertion in the apparatus.

An exemplary and non-limiting holder 104 is illustrated in FIG. 1 as being used to hold the file 400 in place when the file 400 is inserted in the housing 100.

Referring to FIGS. 3A-3B, the method includes scanning the dental file 400 during the first time insertion of the dental file by using the plurality of laser profilometers 300 to create a first 3D surface profile of the dental file 400 (step S303). For example, the laser profilometers 300 can be used to scan the dental file 400 while the dental file is being moved through the first spatial region S1 to create the first 3D surface profile thereof.

In more detail, step S301 can be performed prior to or simultaneously with the scanning of the dental file to create the first 3D surface profile since the file undergoes the scanning process by the laser profilometers 300 while being inserted in the apparatus. In addition, step S301 can be performed prior to or simultaneously with the scanning of the dental file to create the first image thereof since the file undergoes the scanning process by the laser cameras 500 while being inserted in the apparatus.

The first 3D surface of the profile of the dental file 400 may be referred to as a baseline 3D surface profile. The dental file 400 may be inserted in a new (i.e., previously unused) condition in the apparatus to create the baseline 3D profile. This way, the baseline 3D surface profile can depict the profile of the dental file in a new condition.

The method includes scanning the dental file 400 during the first time insertion of the dental file by using the plurality of cameras 500 to create a first image of the dental file (step S305). The first image of the dental file 400 may be a 2D image, as described in this specification.

The first image of the dental file 400 may be referred to as a baseline image. Since the dental file 400 may be inserted in a new condition in the apparatus to create the baseline image, the baseline image can depict the dental file in a new condition.

The method may include using the dental file 400 on a patient for a dental procedure (step S307). For example, the file 400 may be removed from the apparatus after the first time insertion thereof in the apparatus and then used on a patient. The dental file 400 is no longer new after step S307 has been performed.

The method includes inserting the dental file 400 through the first and second spatial regions S1 and S2 a second time (step S309). Step S309 may be performed subsequent to step S307. Therefore, the dental file 400 is in a used condition when performing step S309.

The method includes scanning the dental file 400 during the second time insertion of the dental file through the first and spatial region S1 by using the plurality of laser profilometers 300 to create a second 3D surface profile of the dental file (step S311).

Step S309 can be performed prior to or simultaneously with the scanning of the dental file 400 to create the second 3D surface profile thereof. In addition, step S309 can be performed prior to or simultaneously with the scanning of the dental file 400 to create the second image thereof.

The method includes scanning the dental file during the second time insertion of the dental file 400 through the second spatial region S2 by using the plurality of cameras 500 to create a second image of the dental file (step S313).

The method includes comparing the first and second 3D surface profiles with one another to determine a difference between the first and second 3D surface profiles, or comparing the first and second images with one another to determine a difference between the first and second images (Step S315).

In more detail, step S315 includes comparing the first and second 3D surface profiles with one another to determine whether a difference exists between the first and second 3D surface profiles and comparing the first and second images with one another to determine whether a difference exists between the first and second images.

When step S315 results in no difference found (or existing) between the first and second 3D surface profiles and no difference found between the first and second images, the method may revert to step S307. In this case, the display screen 600 can be used to indicate to a user that the scanned file is suitable for further use on a patient and/or the speaker 700 can be used to emit sounds indicative that the file us suitable for further use.

When step S315 determines that a difference (e.g., a discernable difference) exists between the first and second 3D surface profiles, step S317 can be performed to determine whether the difference between the first and second 3D surface profiles is equal to or greater than a predetermined 3D surface profile difference threshold value.

When step S317 determines that the difference between the first and second 3D surface profiles is equal to or greater than a predetermined 3D surface profile difference threshold value, step S319 can be performed to issue an alert indicative that the file should be discarded. For example, step S319 can include issuing an alert through the at least one selected from the group consisting of the display screen 600 and/or the speaker 700, the alert being indicative that the file should be discarded. When step S319 is performed in response to a determination made in step S317, step S319 may include indicating via the display screen 600 and/or the speaker 700 that the determination to discard has been made based on determining that the difference between the first and second 3D surface profiles is equal to or greater than the predetermined 3D surface profile difference threshold value.

The method may also include performing step S323 subsequent to step S319 to discard the file.

Step S321 includes determining whether the difference between the first and second images is equal to or greater than a predetermined threshold image difference value. When step S321 determines that the difference between the first and second images is equal to or greater than a predetermined threshold image difference value, step S319 may be performed to alert the user to discard the file. When step S319 is performed in response to a determination made in step S321, step S319 may include indicating via the display screen 600 and/or the speaker 700 that the determination to discard has been made based on determining that the difference between the first and second images is equal to or greater than the predetermined threshold image difference value.

When step S317 determines that the difference between the first and second 3D surface profiles is smaller than the predetermined 3D surface profile difference threshold value and when step S321 determines that the difference between the first and second images is smaller than the predetermined threshold image difference value, the method may revert to step S307, along with an indication/alert to the user that the file is suitable for further use on a patient.

The method of the present subject matter can include performing both steps S317 and S321 to assess whether a used file should be discarded. When performing the inquiries of both steps S317 and S321, a positive response resulting from either step S317 or S321 is sufficient to trigger the performance of step S319. However, a response in the negative may be required from both steps S317 and S321 to indicate to a user that the file is acceptable for further use and/or to return the method to step S307.

The method steps S307-S317 and S321 can be performed repetitively in response to the method returning to step S307 due to a negative response in both steps S317 and S321 until either step S317 or step S321 determines (during the rerun) that an alert to discard the file should be issued (step S319). The repeated performance of steps S307-S317 and S321 during the rerun(s) can create a third 3D surface profile of the file, a fourth 3D surface file, and so on, as the case may be, and a third image of the dental file, a fourth image of the dental file and so on, depending on the number of reruns performed.

During the re-runs, the current (or last to be created) 3D surface profile (e.g., the fourth 3D surface profile, as the case may be) is compared with the baseline (or first) 3D surface profile of the file in step S315. Similarly, during the re-runs, the current (or last to be created) image (e.g., the fourth image of the file, as the case may be) is compared with the baseline (or first) image of the file in step S315. This configuration ensures that the current (used) physical condition of a file is compared against the physical condition of the file when it was new to determine whether the file has deteriorated to the point where it should be discarded.

Each 3D surface image of a file and each image of a file created as described in this specification may be stored in the database 900.

Referring to FIG. 1, the rotatable brushing structure 1000 may extend along the third spatial region S3, where the dental file is configured to travel along when inserted in the apparatus for assessment of its physical condition. The motor 1100 is connected to the rotatable brushing structure 1000 and is configured to selectively rotate the rotatable brushing structure 1000.

The first reservoir 1200 is configured to hold a liquid/fluid for cleaning the dental file. The fluid may include water (e.g., distilled water) and/or a cleaning agent for sterilizing or sanitizing the file.

The first conduit 1300 is in fluid communication with the first reservoir 1200. The pump 1400 is configured to suction the liquid and to direct the liquid toward the third spatial region S3 when the dental file is selectively inserted in the third spatial region S3. As illustrated in FIG. 1, the third spatial region S3 may be included within a cleaning chamber 1500 of the housing 100 of the apparatus. The second conduit 1600 is configured to drain the cleaning chamber 1500.

Referring to FIG. 1, the rotatable brushing structure 1000 may include a hollow elongated shell 1020 having an interior through which the third spatial region S3 extends, and a plurality of bristles 1040 disposed in the interior of the hollow elongated shell 1020. The plurality of bristles 1040 may be configured to make contact with the dental file when the dental file is inserted in the third spatial region S3. The hollow elongated shell 1020 may include a plurality of through openings 1060 enabling the cleaning fluid to enter and exit the interior of the hollow elongated shell 1020.

Referring to FIGS. 3A-3B, the method may include cleaning the file (step S306). Step S306 may include powering the motor 1100 when the dental file 400 is selectively inserted in the third spatial region S3 such that the rotatable brushing structure 1000 can be rotated to brush the dental file 400. Step S306 may also include powering the pump 1400 to direct the liquid toward the third spatial region S3 when the dental file is selectively inserted in the third spatial region S3. The combined action of wetting the file and brushing the file can result in a through cleaning of the file.

Referring to FIG. 2, the damping component 800 may be connected to the apparatus (e.g., to the housing 100 or to another component of the apparatus 800 inside of the housing 100). The damping component 800 is configured to frictionally engage the dental file 400 when the dental file is inserted through the first and second spatial regions S1, S2 when performing steps S301, S309.

The friction between the damping component 800 and the file can cause the file 400 to be moved at a constant or substantially constant speed through the first and second spatial regions S1, S2 (and into the apparatus in general) when the file 400 is inserted in the housing 100 by a user. The moving of the file at a constant or substantially constant speed through the first and second spatial regions S1, S2 may produce high quality 3D profile scans and image scans by the laser profilometers 300 and the cameras 500. This, in turn, greatly increases the accuracy of determining whether a used file is still acceptable for use or whether it should be discarded.

As illustrated in FIG. 2, the damping component 800 may have a through opening configured to enable the dental file to pass therethrough. FIG. 2 exemplarily illustrates the file inserted in the through opening of the damping component 800.

The damping component 800 may be made of an elastomeric material. The elastomeric material may include a natural rubber (e.g., latex, gutta-percha, etc.) and/or a synthetic elastomeric material (e.g., silicone, nylon, polyester, etc.).

As illustrated in FIG. 2, the damping component 800 may be disposed on the plurality of laser profilometers 300 and on the plurality of cameras 500 such that the dental file can pass through the through opening of the damping component 800 before passing through the first and second spatial regions S1, S2 during the insertion of the dental file 400 through the first and second spatial regions S1, S2 when performing steps S301, S309.

As illustrated in FIG. 2, the first and second spatial regions S1, S2 may be located inside of the housing 100 of the apparatus. However, the present disclosure is not limited to this configuration. For example, the laser profilometers 300, the cameras 500 and the damping component 800 may also be disposed outside of the housing (e.g., on top of the housing 100 and connected to the housing 100). In this configuration, the first and second spatial regions S1, S2 where the dental file is configured to travel along can be located outside of the housing 100.

Non-limiting examples of the performance of steps S315-S317 and S321 will be described below in detail.

In a non-limiting example, the comparing of the first and second 3D surface profiles with one another in step S315 includes comparing an alignment of protrusions of the dental file 400 relative to an alignment of an elongated body of the dental file, as indicated by the first 3D surface profile, with the alignment of the protrusions of the dental file 400 relative to the alignment of the elongated body of the dental file, as indicated by the second 3D surface profile. This comparison is performed to determine whether the protrusions of a file have opened to a degree that can be interpreted as indicating that the file should be discarded.

FIG. 4A illustrates an exemplary 3D surface profile portion of a dental file (e.g., the dental file 400) obtained by performing step S303, where the dental file 400 is in a new condition. The protrusions 402 may each have an angle $\Theta 1$ relative to the alignment of the elongated body of the dental file when the file 400 is new.

FIG. 4B illustrates an exemplary 3D surface profile portion of the dental file 400 obtained by performing step S311, where the dental file 400 is in a used condition. The protrusions 402 may each have an angle $\Theta 2$ relative to the alignment of the elongated body of the dental file 400 when the file 400 is used to a certain extent.

As illustrated in FIGS. 4A-4B, the angle $\Theta 2$ is greater than angle $\Theta 1$. Therefore, the comparison performed in step S315 may result in determining that a difference exists in the alignment of the protrusions between the first and second 3D surface profiles.

Step S315 may also include quantifying the difference in the alignment of the protrusions between the first and second 3D surface profiles to produce a protrusion alignment difference value (e.g., the protrusion alignment difference value is $\Theta 2 - \Theta 1$, or $\Delta\Theta$). Step S315 may include retrieving a predetermined 3D surface profile difference threshold value for the alignment of the protrusions (e.g., $\Theta X$, which can be included in the database 900).

Step S317 may then be included determining whether $\Delta\Theta$ is equal to or greater than $\Theta X$. In this example, $\Delta\Theta$ may be found to be equal to or greater than $\Theta X$. When $\Delta\Theta$ is found to be equal to or greater than $\Theta X$, step S319 can be performed.

In an example, the comparing of the first and second 3D surface profiles with one another in step S315 includes comparing a length of an elongated body of the dental file, as indicated by the first 3D surface profile, with the length of the elongated body of the dental file, as indicated by the second 3D surface profile. This example can be used to determine whether the wear on the distal tip of a file (e.g., the file 400) has shortened the file 400 beyond an acceptable degree.

FIG. 5A illustrates an exemplary 3D surface profile of a dental file (e.g., the dental file 400) obtained by performing step S303, where the dental file is in a new condition. The 3D surface profile of FIG. 5A illustrates that the file 400 has a length L1 when new.

FIG. 5B illustrates an exemplary 3D surface profile portion of the dental file 400 obtained by performing step S311, where the dental file is in a used condition. The 3D surface profile of FIG. 5B illustrates that the file 400 has a length L2, shorter than the length L1 due to wear, and a blunted distal tip.

In this example, step S315 includes determining that the length L1 of the elongated body of the dental file, as indicated by the first 3D surface profile, is longer than the length of the elongated body of the dental profile L2, as indicated by the second 3D surface profile.

Step S315 may include quantifying a difference in length of the elongated body of the by using the first and second 3D surface profiles to produce a measured length difference value (e.g., the difference in length, $\Delta L$ equals $L1-L2$).

Step S315 may also include retrieving a predetermined length difference threshold value for the dental file (e.g., LX, which can be included in the database 900).

In this example, step S317 includes comparing the produced measured length difference value ΔL with the retrieved predetermined length difference threshold value LX and determining whether the measured length difference is equal to or greater than the retrieved predetermined length difference threshold value (e.g., whether ΔL≥LX). When ΔL is found to be equal to or greater than LX, step S319 can be performed.

In an example, the comparing of the first and second images with one another in step S315 to determine a difference between the first and second images includes analyzing the first image to determine a first quantity of fractures on a surface of the dental file, analyzing the second image to determine a second quantity of fractures on a surface of the dental file, and quantifying a difference between the first and second quantities of fractures to produce a surface fracture difference value.

Figure 6A:
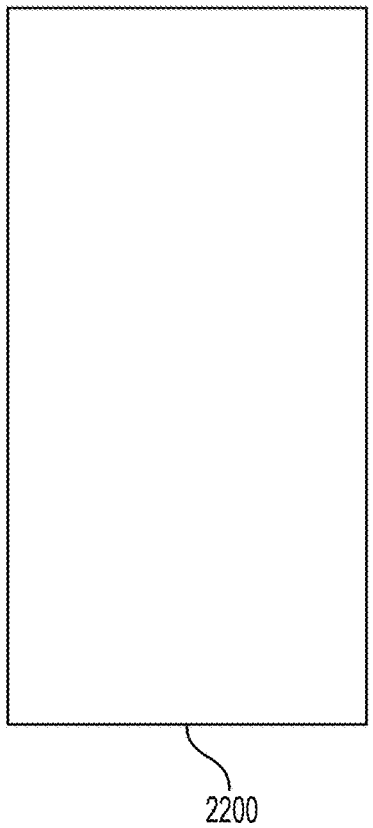
FIG. 6A is a two-dimensional (2D) image illustrating a surface of a dental file in a new condition.

For example, FIG. 6A illustrates a first image 2200 taken of a file (e.g., the file 400) when the file 400 was new. The protrusions 402 are omitted from FIGS. 6A-6B to avoid cluttering the drawings. As illustrated in FIG. 6A, the file 400 in a new condition has no fractures (e.g., no visible cracks on its exterior).

Figure 6B:
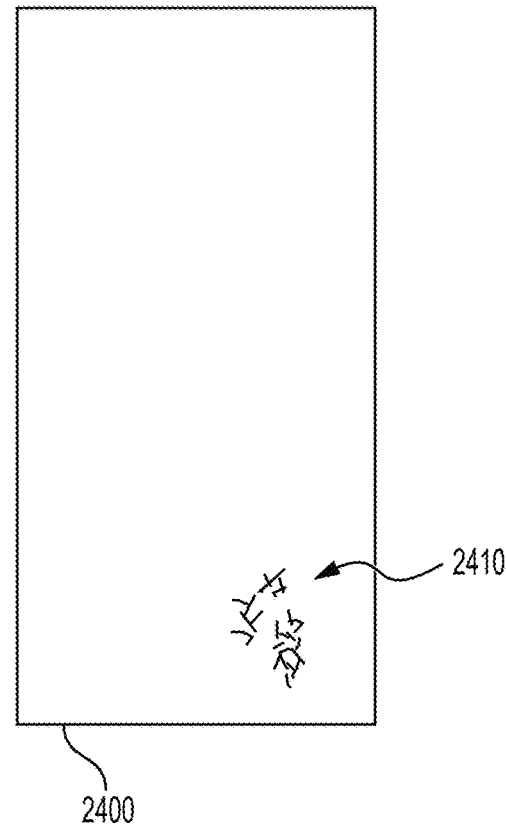
FIG. 6B is a 2D image illustrating the surface of the dental file of FIG. 6B in a used condition.

FIG. 6B illustrates a second image 2400 taken of the file 400 in a used condition. As illustrated in FIG. 6B, the second image 2400 includes depicts a plurality of fractures 2410 on the exterior of the file 400.

In this example, the comparison performed in step S315 includes analyzing the image 2200 to determine a first quantity of fractures on a surface of the dental file when new (i.e., the first quantity is zero, as illustrated in FIG. 6A) and analyzing the image 2400 to determine a second quantity of fractures on a surface of the dental file. The second quantity of fractures is the quantity of fractures (or cracks) 2410 illustrated in FIG. 6B. The second quantity of fractures 2410 may be quantified to produce a surface fracture difference value. An image analysis can be performed on the image 2400 to determine, merely as an example, that the fractures 2410 expand on about 7% of the surface area of the file 400. That is, the surface fracture difference value of the first and second images 2200, 2400 is 7% (7% of coverage of fractures 2410 on image 2400–0% fractures on image 2200=7%).

In this example, step S315 may include retrieving a predetermined threshold value for surface fractures for a file (which may be stored in the database 900). The predetermine threshold value for surface fractures may be, merely as an example, 5% of the surface area of a file.

Step S321 may be performed to compare the surface fracture difference value with the predetermined threshold value for surface fractures and determining whether the surface fracture difference value is equal to or greater than the predetermined threshold value for surface fractures. In the example above, step S321 may be performed to determine that the surface fracture difference value is equal to or greater than the predetermined threshold value for surface fractures (i.e., 7%≥5%). In this case, step S319 can be performed.

The example provide with reference to FIGS. 6A-6B can also be performed for chipping on the surface of a file, the difference being that the first and second images would be analyzed for the presence of chips on the surface of the file, to quantify the surface are of the file occupied by chips in the second image, and comparing that value with a predetermined threshold chipping value.

While the present disclosure has been particularly shown and described with reference to exemplary embodiments thereof, it will be apparent to those of ordinary skill in the art that various changes in form and detail may be made therein without departing from the spirit and scope of the present disclosure as defined by the following claims.

What is claimed is:

1. An apparatus for recommending whether to discard a dental file after use, the apparatus comprising:
a processor;
a plurality of laser profilometers spaced from one another and oriented to direct their respective laser beams toward a first spatial region where a dental file is configured to travel along; a plurality of cameras spaced apart from one another and oriented toward a second spatial region where the dental file is configured to travel along;
at least one selected from the group consisting of a display screen and a speaker; and
a non-transitory, tangible program storage medium, embodying a program of instructions executable by the processor to perform method steps for determining to discard the dental file, the method comprising:
inserting the dental file through the first and second spatial regions a first time;
scanning the dental file during the first time insertion of the dental file through the first and second spatial regions, by using the plurality of laser profilometers, to create a first three-dimensional (3D) surface profile of the dental file;
scanning the dental file during the first time insertion of the dental file through the first and second spatial regions, by using the plurality of cameras, to create a first image of the dental file;
using the dental file on a patient for a dental procedure;
inserting the dental file through the first and second spatial regions a second time;
scanning the dental file during the second time insertion of the dental file through the first and second spatial regions, by using the plurality of laser profilometers, to create a second 3D surface profile of the dental file;
scanning the dental file during the second time insertion of the dental file through the first and second spatial regions, by using the plurality of cameras, to create a second image of the dental file;
either comparing the first and second 3D surface profiles with one another to determine a difference between the first and second 3D surface profiles, or comparing the first and second images with one another to determine a difference between the first and second images;
either determining if the difference between the first and second 3D surface profiles is equal to or greater than a predetermined 3D surface profile difference threshold value, or determining if the difference between the first and second images is equal to or greater than a predetermined threshold image difference value; and
issuing an alert through the at least one selected from the group consisting of the display screen and the speaker, the alert being indicative that the file should be discarded as a result of: a) determining that the difference between the first and second 3D surface profiles is equal to or greater than the predetermined 3D surface profile difference threshold value, or b) determining that the difference between the first and second images is greater than the predetermined threshold image difference value.

2. The apparatus of claim 1, further comprising:
a rotatable brush extending along a third spatial region where the dental file is configured to travel along;
a motor connected to the rotatable either comparing the first and configured to selectively rotate the same;
a first reservoir configured to hold a liquid for cleaning the dental file;
a first conduit in fluid communication with the first reservoir;
a pump configured to suction the liquid and to direct the same toward the third spatial region when the dental file is selectively inserted in the third spatial region, the third spatial region being included within a cleaning chamber of a housing of the apparatus; and
a second conduit configured to drain the cleaning chamber of the housing;
wherein the method further includes:
powering the motor when the dental file is selectively inserted in the third spatial region such that the rotatable brush is rotated to brush the dental file; and
powering the pump to direct the liquid toward the third spatial region when the dental file is selectively inserted in the third spatial region.

3. The apparatus of claim 2, further comprising a second reservoir in fluid communication with the second conduit, the second reservoir being a drainage reservoir.

4. The apparatus of claim 1, further comprising a damping component connected to a housing of the apparatus, wherein the damping component is configured to frictionally engage with the dental file when the dental file is inserted through the first and second spatial regions.

5. The apparatus of claim 4, wherein the damping component has a through opening configured to enable the dental file to pass therethrough.

6. The apparatus of claim 5, wherein the damping component is made of an elastomeric material.

7. The apparatus of claim 6, wherein the elastomeric material includes a natural rubber or a synthetic elastomeric material.

8. The apparatus of claim 5, wherein the damping component is disposed on the plurality of laser profilometers and on the plurality of cameras such that the dental file can pass through the through opening of the damping component before passing through the first and second spatial regions during the inserting of the dental file through the first and second spatial regions for the first time.

9. The apparatus of claim 1, further comprising a database configured to store the first and second 3D surface profiles of the dental file and the first and second images of the dental file.

10. The apparatus of claim 2, wherein the rotatable brush includes:
a hollow elongated shell having an interior through which the third spatial region extends; and
a plurality of bristles disposed in the interior of the hollow elongated shell, the plurality of bristles being configured to make contact with the dental file when the dental file is inserted in the third spatial region.

11. The apparatus of claim 2, wherein the first reservoir holds the liquid for cleaning the dental file.

* * * * *